United States Patent
Provancher

(10) Patent No.: US 8,610,548 B1
(45) Date of Patent: Dec. 17, 2013

(54) COMPACT SHEAR TACTILE FEEDBACK DEVICE AND RELATED METHODS

(75) Inventor: William R. Provancher, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 848 days.

(21) Appl. No.: 12/699,494

(22) Filed: Feb. 3, 2010

Related U.S. Application Data

(60) Provisional application No. 61/149,561, filed on Feb. 3, 2009.

(51) Int. Cl.
*H04B 3/36* (2006.01)

(52) U.S. Cl.
USPC .................................. 340/407.1; 340/500

(58) Field of Classification Search
USPC ....................................................... 340/407.1
See application file for complete search history.

(56) References Cited

U.S. PATENT DOCUMENTS

| | | |
|---|---|---|
| 4,540,979 A | 9/1985 | Gerger et al. |
| 4,591,868 A | 5/1986 | Cusey |
| 5,028,093 A | 7/1991 | Nason |
| 5,184,319 A | 2/1993 | Kramer |
| 5,261,266 A | 11/1993 | Lorenz et al. |
| 5,273,384 A | 12/1993 | Dunbar |
| 5,451,924 A | 9/1995 | Massimino |
| 5,587,937 A | 12/1996 | Massie et al. |
| 5,589,828 A | 12/1996 | Armstrong |
| 5,625,576 A | 4/1997 | Massie et al. |
| 5,631,861 A | 5/1997 | Kramer |
| 5,694,013 A | 12/1997 | Stewart et al. |
| 5,709,219 A | 1/1998 | Chen |
| 5,721,405 A | 2/1998 | Hamada |
| 5,752,795 A | 5/1998 | D'Adamo |
| 5,765,791 A | 6/1998 | Givonetti |
| 5,767,796 A | 6/1998 | Van Roekel et al. |
| 5,786,997 A | 7/1998 | Hoyt et al. |
| 5,898,599 A | 4/1999 | Massie et al. |
| 6,042,555 A | 3/2000 | Kramer |
| 6,135,691 A | 10/2000 | Nadarajah et al. |

(Continued)

FOREIGN PATENT DOCUMENTS

| | | |
|---|---|---|
| JP | 2005 129044 | 5/2005 |
| KR | 20-0222674 | 5/2001 |

(Continued)

OTHER PUBLICATIONS

Related Case: U.S. Appl. No. 12/699,494, filed Feb. 5, 2009; William R. Provancher.

(Continued)

*Primary Examiner* — Kerri McNally
(74) *Attorney, Agent, or Firm* — Workman Nydegger

(57) ABSTRACT

A motion translating device for use in tactile feedback system comprises a motion output device, operable to impart motion from the translator to a motion output device. A frame assembly is operable to translate motion from at least one actuator to the motion output device along at least a first axis and a second axis. The frame assembly has associated therewith a motion decoupling apparatus. The motion decoupling apparatus is operable to translate motion between an actuator and the frame assembly along one of the axes while at least partially decoupling motion between an actuator and the frame assembly along an other axis.

18 Claims, 7 Drawing Sheets

(56) References Cited

U.S. PATENT DOCUMENTS

| | | | |
|---|---|---|---|
| 6,158,933 | A | 12/2000 | Nicholson |
| 6,184,868 | B1 | 2/2001 | Shahoian et al. |
| 6,208,328 | B1 | 3/2001 | Kawachiya et al. |
| 6,236,306 | B1 | 5/2001 | Liebelt |
| 6,246,391 | B1 | 6/2001 | Ong |
| 6,330,837 | B1 | 12/2001 | Charles |
| 6,388,655 | B1 | 5/2002 | Leung |
| 6,417,638 | B1 | 7/2002 | Guy et al. |
| 6,418,362 | B1 | 7/2002 | St. Pierre et al. |
| 6,494,658 | B1 | 12/2002 | Roy |
| 6,535,806 | B2 | 3/2003 | Millsap et al. |
| 6,565,059 | B1 | 5/2003 | Falconer |
| 6,691,972 | B1 | 2/2004 | Oliver |
| 6,693,516 | B1 | 2/2004 | Hayward |
| 6,693,622 | B1 | 2/2004 | Shahoian et al. |
| 6,697,044 | B2 | 2/2004 | Shahoian et al. |
| 6,703,999 | B1 | 3/2004 | Iwanami et al. |
| 6,788,999 | B2 | 9/2004 | Green |
| 6,793,234 | B2 | 9/2004 | Carlstedt et al. |
| 6,808,350 | B1 | 10/2004 | Tooman et al. |
| 6,859,819 | B1 | 2/2005 | Rosenberg et al. |
| 6,930,590 | B2 | 8/2005 | Ling et al. |
| 6,961,644 | B2 | 11/2005 | Mercier et al. |
| 6,982,696 | B1 | 1/2006 | Shahoian |
| 6,995,745 | B2 | 2/2006 | Boon et al. |
| 7,077,015 | B2 | 7/2006 | Hayward et al. |
| 7,084,854 | B1 | 8/2006 | Moore et al. |
| 7,152,331 | B2 * | 12/2006 | Nakamura et al. ............. 33/1 M |
| 7,196,688 | B2 | 3/2007 | Schena |
| 7,209,118 | B2 | 4/2007 | Shahoian et al. |
| 7,215,320 | B2 | 5/2007 | Takeuchi et al. |
| 7,242,112 | B2 | 7/2007 | Wolf et al. |
| 7,271,707 | B2 * | 9/2007 | Gonzales ................... 340/407.1 |
| 7,333,088 | B2 | 2/2008 | Boon et al. |
| 7,339,574 | B2 | 3/2008 | Kyung et al. |
| 7,450,110 | B2 | 11/2008 | Shahoian et al. |
| 7,603,214 | B2 | 10/2009 | Tanaka et al. |
| 7,605,694 | B2 | 10/2009 | Prost-Fin et al. |
| 7,607,087 | B2 | 10/2009 | Prados |
| 7,683,735 | B2 | 3/2010 | Shibahara |
| 7,692,552 | B2 | 4/2010 | Harrington et al. |
| 7,710,279 | B1 | 5/2010 | Fields |
| 8,004,052 | B2 | 8/2011 | Vaganov |
| 8,125,453 | B2 | 2/2012 | Shahoian |
| 2001/0052893 | A1 | 12/2001 | Jolly et al. |
| 2002/0033795 | A1 | 3/2002 | Shahoian |
| 2002/0145512 | A1 | 10/2002 | Sleichter, III et al. |
| 2003/0016207 | A1 | 1/2003 | Tremblay |
| 2004/0010346 | A1 | 1/2004 | Stewart |
| 2004/0040805 | A1 | 3/2004 | Bailey |
| 2004/0060807 | A1 | 4/2004 | Nishimoto |
| 2004/0095369 | A1 | 5/2004 | Takeuchi |
| 2004/0104887 | A1 * | 6/2004 | Tsukamoto et al. .......... 345/156 |
| 2004/0106916 | A1 | 6/2004 | Quaid et al. |
| 2004/0117084 | A1 | 6/2004 | Mercier |
| 2004/0129552 | A1 | 7/2004 | Nakade |
| 2004/0227727 | A1 | 11/2004 | Schena et al. |
| 2004/0237669 | A1 | 12/2004 | Hayward |
| 2005/0021190 | A1 | 1/2005 | Worrell et al. |
| 2005/0052415 | A1 | 3/2005 | Braun et al. |
| 2005/0073195 | A1 | 4/2005 | Popilek |
| 2005/0110754 | A1 | 5/2005 | Harley et al. |
| 2005/0110758 | A1 | 5/2005 | Kyung et al. |
| 2005/0222830 | A1 | 10/2005 | Massie |
| 2005/0231686 | A1 | 10/2005 | Rathjen |
| 2006/0115347 | A1 | 6/2006 | Lee |
| 2006/0115348 | A1 | 6/2006 | Kramer |
| 2006/0185921 | A1 | 8/2006 | Cieler et al. |
| 2006/0192760 | A1 | 8/2006 | Moore et al. |
| 2006/0227065 | A1 | 10/2006 | Yukawa et al. |
| 2006/0256075 | A1 | 11/2006 | Anastas et al. |
| 2007/0008083 | A1 | 1/2007 | Berg et al. |
| 2007/0091063 | A1 | 4/2007 | Nakamura et al. |
| 2007/0100523 | A1 | 5/2007 | Trachte |
| 2007/0241595 | A1 | 10/2007 | Nathan et al. |
| 2007/0265077 | A1 | 11/2007 | Tom et al. |
| 2007/0299580 | A1 | 12/2007 | Lin et al. |
| 2008/0024284 | A1 | 1/2008 | Baratoff et al. |
| 2008/0085582 | A1 | 4/2008 | Prest et al. |
| 2008/0111791 | A1 | 5/2008 | Nikittin |
| 2008/0120029 | A1 | 5/2008 | Zelek |
| 2008/0192002 | A1 | 8/2008 | Funch et al. |
| 2008/0193260 | A1 | 8/2008 | Yokokohji et al. |
| 2009/0036212 | A1 | 2/2009 | Provancher |
| 2009/0096746 | A1 * | 4/2009 | Kruse et al. ................... 345/156 |
| 2009/0160770 | A1 | 6/2009 | Shahoian |
| 2009/0179854 | A1 | 7/2009 | Weber et al. |
| 2009/0278798 | A1 | 11/2009 | Kim |
| 2010/0070254 | A1 | 3/2010 | Tsai |
| 2011/0032090 | A1 | 2/2011 | Provancher |
| 2011/0115754 | A1 | 5/2011 | Cruz-Hernandez |
| 2012/0038468 | A1 | 2/2012 | Provancher |
| 2012/0122062 | A1 | 5/2012 | Yang |

FOREIGN PATENT DOCUMENTS

| | | |
|---|---|---|
| WO | WO0191100 | 11/2001 |
| WO | WO 03/012557 | 2/2003 |
| WO | WO 2006/115347 | 11/2006 |
| WO | WO 2009/018330 | 2/2009 |
| WO | WO 2009/129287 | 10/2009 |

OTHER PUBLICATIONS

Related Case: U.S. Appl. No. 12/949,303, filed Nov. 18, 2010; William R. Provancher.

Arai et al.; Tactile Display Which Presents Shear Deformation on Human Finger; Proceedings of the 2001 IEE International Conference on Robotics & Automation; Seoul, Korea; May 21-26, 2001.

U.S. Appl. No. 12/182,906, filed Jul. 30, 2008; William R. Provancher; office action issued Mar. 29, 2011.

Micah Steele et al., Shared Control Between Human and Machine: Using a Haptic Steering Wheel to aid in Land Vehicle Guidance. University of Michigan, Ann Arbor, MI. 5 pages, Oct. 2002.

Mark Salada et al., Fingertip Haptics: A Novel Direction in Haptic Display. Northwestern University, Dept. of Mechanical Engineering and Dept. of Psychology. 2002. 10 pages, Jun. 2002.

Knut Drewing et al., First Evaluation of a Novel Tactile Display Exerting Shear Force via Lateral Displacement. ACM Transactions on Applied Perception, vol. 2, Apr. 2005, pp. 118-131.

Vincent Hayward et al., Tactile Display Device Using Distributed Lateral Skin Stretch. Dept. of Electrical Engineering Center for Intelligent Machines. McGill University. 2000. 6 pages, Nov. 2000.

Vincent Levesque et al., Experimental Evidence of Lateral Skin Strain During Tactile Exploration. Center for Intelligent Machines. Dept. of Electrical and Computer Engineering, McGill University. 2003 pp. 261-275, Jul. 2003.

Aaron Morris et al., A Robotic Walker That Provides Guidance. School of Computer Science, Carnegie Mellon University, Pittsburg PA. 2003, 6 pages, Sep. 2003.

Kanav Kahol et al., Tactile Cueing Haptic Visualization. Center for Cognitive Ubiquitous Computing. Arizona State University, Tempe Arizona. 2005. 4 pages, Apr. 2005.

Roope Raisamo & Jukka Raisamo. Haptic User Interfaces 2007. Power point presentation. 10 pages, Oct. 2007.

Alejandro D. Dominquez-Garcia et al., Haptic Interface for Automotive Steer-by-Wire Systems. Massachusetts Institute of Technology, Laboratory for Electromagnetic and Electronic Systems. Abstract, 2006 1 page, Apr. 2006.

Fritschi et al., "Integration of Kinesthetic and Tactile Display—A Modular Design Concept," Max-Planck Institute for Biological Cybernetics, Germany, 6 pages, no date, Jul. 2006.

Kim, Youn et al., "Hand-writing rehabilitation in the haptic virtual environment" IEEE, 2006, pp. 161-164, Nov. 2006.

Mullins, James et al., "Haptic handwriting aid for training and rehabilitation" 5 pages, Oct. 2005.

Rabin, Ely et al., "Haptic stabilization of posture: changes in arm proprioception and cutaneous feedback for different arm orientations" The American Physiologial Society, 1999, pp. 3541-3549, Aug. 1999.

(56) References Cited

OTHER PUBLICATIONS

Lam Paul, et al., "A haptic-robotic platform for upper-limb reaching stroke therapy: preliminary design and evaluation results" Journal of NeuroEngineering and Rehabilitation, May 22, 2008, 13 pages.
Rassmus-Grohn, Kirsten, "Enabling Audio-Haptics" Certec, Lund 2006, 126 pages, Feb. 2006.
Mali Uros, et al., "HIFE-haptic interface for finger exercise" IEEE, Feb. 2006, vol. 11, No. 1, pp. 93-102.
Phantom Premium 1.5/6DOF, 1.5 Highforce/6DOF and 3.0/6DOF haptic devices, 2 pages, Jun. 2009.
Cavusoglu, M. Cent et al., "Robotices for telesurgery: second generation berkely/UCSF laparoscopic telesurgical workstation and looking towards the future applications" Special issue on Medical Robotics, Jan. 2003, vol. 30, No. 1., 11 pages.
Sallnas, Eva-Lotta, "Supporting presence in collaborative environments by haptic force feedback" ACM Transactions on Computer-Human Interaction, Dec. 2000, vol. 7, No. 4, pp. 461-476.
Sjostrom, Calle et al., "The sense of touch provides new computer interaction techniques for disable people" Technology and Disabilty pp. 45-52, Dec. 1998.
Sjostrom, Calle et al., "The sense of touch provides new computer interaction techniques for disable people," Sweden 9 pages, Dec. 1998.
Abbott, Jake et al., "Haptic virtual fixtures for robot-assisted manipulation" Department of Mechanical Engineering, The Johns Hopkins University. 11 pages, Oct. 2005.
Maclean, Karon, Haptics and the user interface, www.cs.ubc.ca/~maclean/publics/ 27 pages, Feb. 2008.
Phantom desktop haptic device, SensAble Technologies, Inc. 2 pages, Jun. 2009.
Provancher, U.S. Appl. No. 12/402,067, filed Mar. 11, 2009.
Provancher, U.S. Appl. No. 12/182,906, filed Jul. 30, 2008.
U.S. Appl. No. 12/949,303, filed Nov. 18, 2010, Provancher.
U.S. Appl. No. 13/041,169, filed Mar. 4, 2011, Provancher.
International Search Report for PCT/US2011/055633 dated Mar. 27, 2012.
Written Opinion for PCT/US2011/055633 dated Mar. 27, 2012.
International Search Report for PCT/US2008/071574 dated Mar. 18, 2009.
Written Opinion for PCT/US2008/071574 dated Mar. 18, 2009.
International Search Report for PCT/US2013/032053 dated Jul. 25, 2013.
Written Opinion for PCT/US2013/032053 dated Jul. 25, 2013.
U.S. Appl. No. 13/269,948, Mail Date Mar. 15, 2013, Office Action.
U.S. Appl. No. 12/402,067, Mail Date Aug. 3, 2012, Notice of Allowance.
U.S. Appl. No. 12/182,906, Mail Date Mar. 29, 2011, Office Action.
U.S. Appl. No. 12/182,906, Mail Date Sep. 19, 2011, Final Office Action.

\* cited by examiner

COMPACT SHEAR TACTILE FEEDBACK DEVICE AND RELATED METHODS

PRIORITY CLAIM

Priority is claimed of U.S. Provisional Patent Application Ser. No. 61/149,561, filed Feb. 3, 2009, which is hereby incorporated herein by reference in its entirety.

FIELD OF THE INVENTION

The present invention is related to haptic devices capable of providing information to a user via application of shear forces to the user's skin.

BACKGROUND OF THE INVENTION AND RELATED ART

The field of haptics is the science of interfacing with users via the sense of touch by applying forces, vibrations or motions to a user. Haptic devices are increasingly being used to provide sensory input to a user to provide information to the user: similar to the manner in which sights and sounds provide information to the user about a surrounding environment. As an example, one commonly available (albeit simplistic) haptic device is the game stick (or "joystick") controller sold by Nintendo under the trade name "Rumble Pak." This haptic device produces vibratory motion at various times during gameplay to provide the game player, through his or her sense of touch, with information relating to a scenario of the game: e.g., when he or she fires a weapon or receives damage in the game. Haptic devices are also recognized as an integral part of virtual reality systems, which attempt to simulate, through the application of forces to a participant, situations he or she "experiences" in the virtual environment.

While haptic devices have been produced for a variety of uses, many technological hurdles remain. As one example, many haptic devices must be produced on a relatively small scale, particularly those used in fingertip applications. Generating an effective, small scale haptic feedback device at commercially reasonable prices remains a challenge.

SUMMARY OF THE INVENTION

In accordance with one embodiment, the present invention provides a motion translating device for use in tactile feedback system, including a motion output device, operable to impart motion from the translator to a motion output device. A frame assembly can be operable to translate motion from at least one actuator to the motion output device along at least a first axis and a second axis. The frame assembly can have associated therewith a motion decoupling apparatus, the motion decoupling apparatus being operable to translate motion between an actuator and the frame assembly along one of the axes while at least partially decoupling motion between an actuator and the frame assembly along an other axis.

In accordance with another aspect of the invention, a tactile display system is provided, including a motion output device, operable to engage a target area of a user's skin. A restraining system can be operable to restrain a portion of the user's skin adjacent the motion output device. An actuation system can include at least one actuator. The actuation system can be operably coupled to the motion output device and can include: a first frame operable to translate motion from an actuator to the motion output device along a first axis; a second frame operable to translate motion from an actuator to the motion output device along a second axis. Each frame can have associated therewith a motion decoupling apparatus, each motion decoupling apparatus being operable to translate motion between an actuator and the frame along one of the axes while at least partially decoupling motion between an actuator and the frame along an other axis.

In accordance with another aspect of the invention, a method of translating motion from a pair of actuators to a motion output device of a tactile display is provided, including: coupling a motion output device to one of a pair of frames; and coupling each frame to an actuator through a motion decoupling apparatus, each motion decoupling apparatus being operable to translate motion between the actuator and the frame along one axis of movement while at least partially decoupling motion between the actuator and the frame along another axis of movement.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1A:
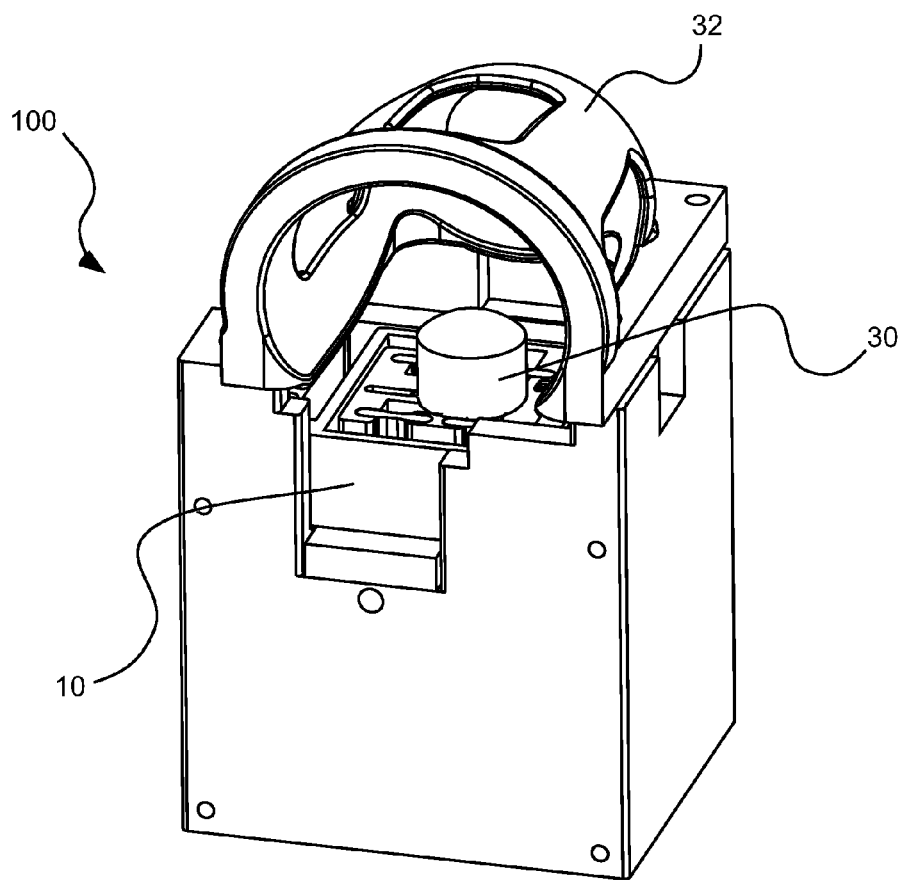
FIG. 1A is perspective view of a compact tactile display system in accordance with an embodiment of the invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

DEFINITIONS

In describing and claiming the present invention, the following terminology will be used.

The singular forms "a," "an," and "the" can include plural referents unless the context clearly dictates otherwise. Thus, for example, reference to "a sensor" can include reference to one or more of such devices. Reference to "moving" an object can include reference to one or more steps or increments involved in moving the object.

When discussed herein, application of a shear force or motion to a user's skin is to be understood to refer to application of a force that results in a sliding motion or "skin stretch" being applied to the user's skin such that the user's skin is pulled (or tends to be pulled) in a transverse, as opposed to a normal, direction. Such an application will tend to create a tensile force on a trailing edge of the skin being targeted and a compressive force on a leading edge of the skin. Shear forces can be applied to the skin while sliding a contact pad across the skin (e.g., some slip occurs between the contact pad and the targeted skin); or while moving the contact pad and the surface of the skin together (e.g., little or no slip between the contact pad and the targeted skin).

Application of shear forces is to be understood to be distinct from application of kinesthetic forces, as that term is understood by those of ordinary skill in the art. As one example, the application of shear force to a user's finger pad by moving a shear plate transverse to the user's finger pad (thereby causing local skin deformations) is to be distinguished from the kinesthetic forces and motions experienced by a user as a stylus or other device is applied to a user's fingers or hand causing (or tending to cause) motion of the finger, hand, and/or arm joints. The local shear deformations in the skin resulting from moving a shear plate transverse to the user's skin are also distinct from the forces experienced by a user when a device is merely vibrated to provide information to a user.

Typically, application of a shear force requires relative movement of the user's target skin area (e.g., finger pad or palm) relative to a shear plate, which relationship can occur by way of movement of the target skin area, movement of the shear plate, or both. Typically speaking, however, relative transverse movement is required to apply the shear force that is reacted locally, whereas application of kinesthetic forces can be realized without locally reacted relative transverse motion, since the kinesthetic forces are reacted away from the target area of the skin.

As used herein, relative terms, such as "upper," "lower," "upwardly," "downwardly," etc., are used to refer to various components of the systems discussed herein, and related structures with which the present systems can be utilized, as those terms would be readily understood by one of ordinary skill in the relevant art. It is to be understood that such terms are not intended to limit the present invention, but are rather used to aid in describing the components of the present systems, and related structures generally, in the most straightforward manner.

As used herein, the term "substantially" refers to the complete or nearly complete extent or degree of an action, characteristic, property, state, structure, item, or result. As an arbitrary example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As an arbitrary example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Embodiments of the Invention

In one aspect, the present invention provides a compact device capable of providing tactile feedback in distal, proximal, ulnar, and radial motions to the fingertip of a human.

Devices in accordance with the present invention can include one or more actuators and a unique flexure stage (e.g., a motion translating frame) to create this motion. The flexure stage typically includes one or more motion decoupling mechanisms to at least partially decouple motion between the actuators and a motion output in one or more axes. Thus, even though the actuators used in the system may be generating multi-axis movement, the flexure stage isolates the motion translated to an output device to substantially a single axis.

One exemplary embodiment of the present invention is shown in FIGS. 1A through 3B. In this embodiment, a tactile display system 100 is provided that can include a motion output device 30 (also sometimes referred to as a "tactor") that can be operable to engage a target area of a user's skin. A restraining system 32 can be operable to restrain a portion of the user's skin adjacent the motion output device. In the embodiment shown, the restraining system comprises a thimble into which a user's finger can be inserted and restrained relative to potential movement of the tactor. An actuation system (shown generally at 34 in FIG. 1B) can be provided that includes at least one actuator 36i. In the embodiment shown, a pair of actuators 36a, 36b is provided, each being a servo motor actuator. Each of the servo motors is operably coupled to the motion output device via a flexure device, stage or frame 10.

The flexure stage 10 can be operable to confine the motion induced by each servo motor 36a, 36b to substantially a single axis. In one embodiment, the flexure stage can provide a travel of plus or minus 1 mm nominally and up to plus or minus 3 mm maximum. In one example, RC micro servos were incorporated into the device, the RC micro servos of the type sold under the name Cirus CS-101 4g. The servos can have a range of motion of 180 degrees: the system can utilizes about 50% of this range, equating to about 45 degrees of rotary motion to achieve 1 mm of linear motion. The device can use a Thin kPad TrackPoint tactor for the motion output device 30.

The tactile display 100 can exhibit a package design that is compact and modular such that it can be placed on the fingerpad of a thimble interface or embedded as part of other devices such as a computer mouse, steering wheel, telesurgical robot control interface, or a cane used by sight impaired individuals. It can be readily incorporated into the various systems disclosed in U.S. patent application Ser. No. 12/182,906, filed Jul. 30, 2008, which is hereby incorporated herein by reference in its entirety.

The tactile feedback from the current invention can be used to communicate cursor location or suggested motions for mouse input. The shear feedback device can also be wirelessly activated and controlled, as would occur to one of ordinary skill in the art having possession of this disclosure. Wireless communication can enable applications in mobile navigation, especially foot-based mobile applications (e.g., the device can communicate with Google Maps™ on a PDA or cell phone, or the military can deploy soldiers with wireless enabled shear devices). Assistive technologies can also be enabled for blind or blind/deaf individuals.

The device can be used to provide tactile feedback in combination with a commercial 3-D force feedback device such as a PHANToM, made by SensAble Technologies. The present device can replace the PHANToM's current thimble interface, creating the ability for thousands of PHANToM owners to add tactile feedback to their devices.

The device can also be utilized as an alternative form of input device to the common computer mouse. The device could be used in combination with trackpoint mouse input interfaces of a variety of types. Assuming large displacements (e.g., +/−5 mm in two dimensions), the shear display can be used to represent or enhance the current location of the computer cursor. Alternatively, the device could be used to transmit shearing motions to the skin of the fingerpad to suggest which direction the user should move his or her finger to attend to a particular task or application.

Because of its compact design, the tactile display device can be added to many current devices and possibly suitable for applications in wearable or mobile computing. For instance, it can be used as part of a gaming controller interface. Great potential lies in applications which require communication of directional information. An example of this includes embedding several of the present devices into the steering wheel of an automobile, to communicate information from a GPS navigation system. Another example is to place one of the devices in the handle of an ultrasonic cane used by vision impaired individuals to guide them around obstacles. The shearing motion provided to the user's skin in each of these applications can provide the suggested direction cues in a very intuitive manner.

Figure 1B:
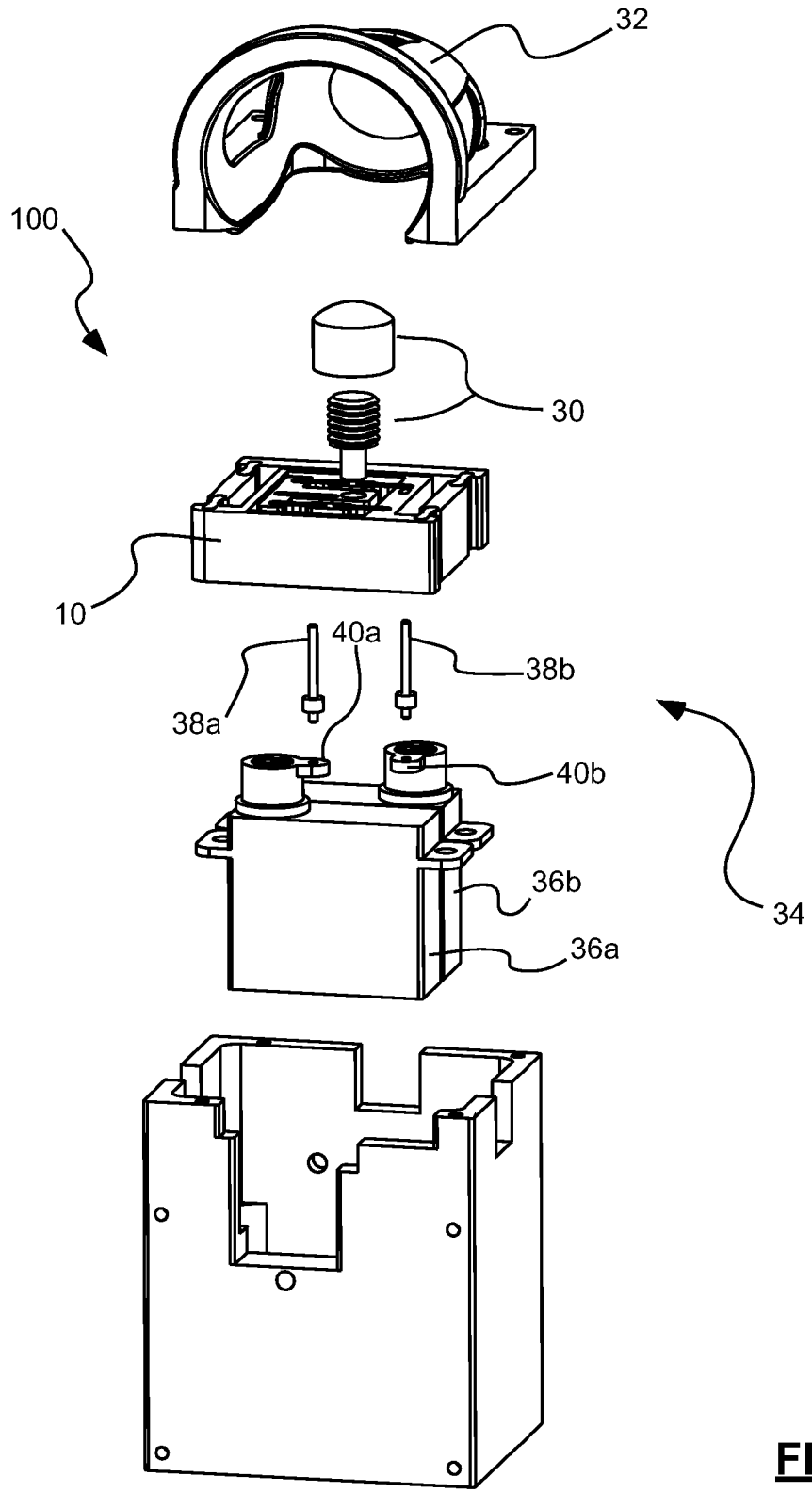
FIG. 1B is a perspective, exploded view of the compact tactile display system of FIG. 1A.
Figure 2:
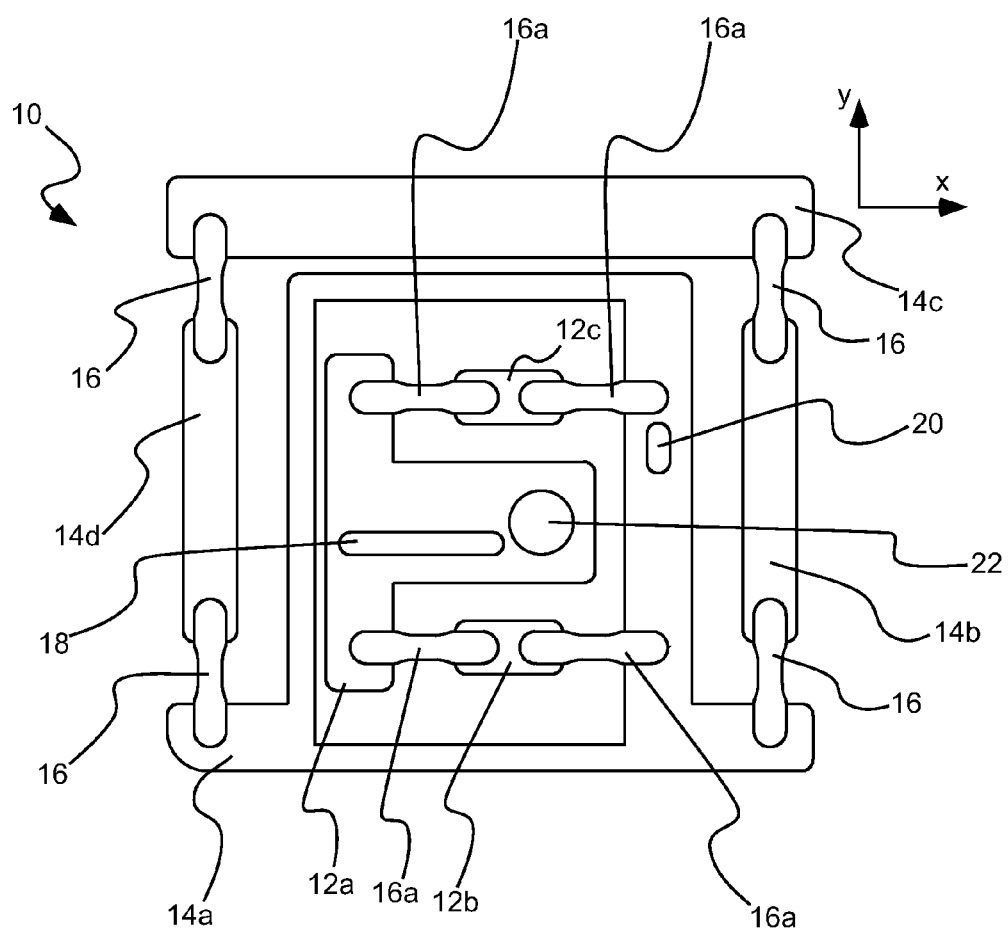
FIG. 2 is top, plan view of a flexure frame in accordance with one embodiment of the invention.
Figure 3A:
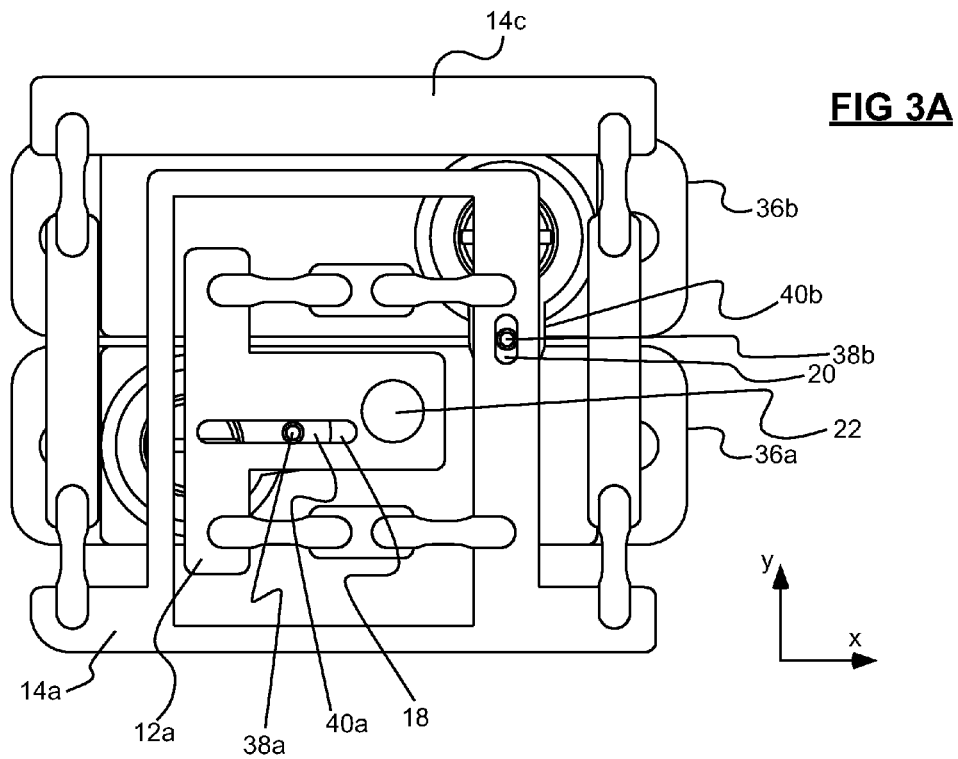
FIG. 3A is a top, plan view of the flexure frame of FIG. 2 coupled atop a tactile controller having a pair of servo motor actuators in accordance with an embodiment of the invention.
Figure 3B:
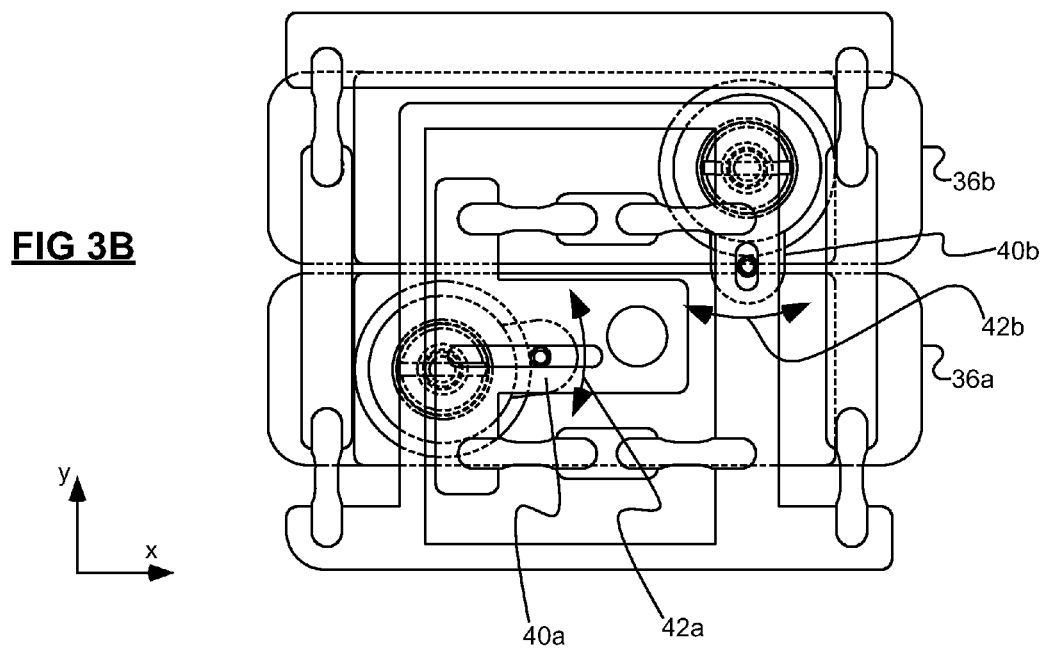
FIG. 3B is a top, plan view of the system of FIG. 3A, with hidden features shown in greater detail.

Turning now to FIGS. 2 through 3B, the flexure device (or flexure stage or frame) 10 is shown and described in more detail. The flexure stage can include a plurality of frame members. In the example shown, frame member 12a forms an inner frame while frame member 14a forms a middle frame. Members 12b and 12c acting as links between inner frame member 12a and middle frame member 14a. Members 14b and 14d act as links to connect middle frame member 14a to outer frame member 14c. Spring or biasing members 16 and 16a serve to allow the various frame members to move relative to one another. The springs or biased members aid in limiting the transference of motion between frame 12 and frame 14. For example, note that spring members 16a will flex as frame member 12a moves in the y-axis, but with little or no resulting motion of frame member 14a (conversely, movement of frame member 12a in the x-axis would be translated through springs 16a to cause frame member 14a to move in the x-axis). Output 22 can be used to couple the flexure to an external output device (30 in FIG. 1), e.g., a TrackPoint tactor interface.

Slot 18 is formed in frame member 12a and serves to decouple motion imparted to the frame member 12a in the direction of the x-axis: in this manner, substantially all motion imparted to frame member 12a via the slot is translated into y-axis motion. Slot 20 is formed in frame member 14a and serves to decouple motion imparted to frame member 14a in the y-axis: in this manner, substantially all motion imparted to frame member 14a via slot 20 is translated to x-axis motion.

FIGS. 3A and 3B illustrate an exemplary manner in which the system can be configured. This embodiment of invention includes two servo motors 36a, 36b, which are configured to generate rotational motion via arms 40a, 40b, respectively. Directional indicators 42a, 42b of FIG. 3B represent the rotational movement of arms 40a, 40b. Frame member 14c can be fixed relative to an external structure. A motion output (e.g., 30 in FIG. 1) can be coupled to the output interface opening 22. One of the servo motors 36a can be coupled to frame member 12a by way of pin 38a extending into slot 18 (see also FIG. 1B). The pin 38a will generally move in an arc, as illustrated by directional indicator 42a in FIG. 3B. As the pin moves in the y-axis, the frame member 12a will impart y-axis motion to the output 22. However, as the pin moves in the x-axis, it will simply slide within the slot 18 and not impart motion to the frame member or the output in the x-axis.

Similarly, servo motor 36b can be coupled to frame member 14a by way of pin 38b extending into slot 20 (see also FIG. 1B). The pin 38b will generally move in an arc, as illustrated by directional indicator 42b in FIG. 3B. As the pin moves in the x-axis, frame member 14a will impart motion to frame member 12a, which will in turn impart x-axis motion to the output 22. However, as the pin moves in the y-axis, it will simply slide within the slot 20 and will accordingly not impart motion to the frame member or the output in the y-axis.

In this manner, the present invention provides a system that decouples motion imparted to the flexure stage by one or more actuators such that each actuator only imparts motion to the flexure in a single axis of movement. Thus, in the embodiment illustrated in FIGS. 1B, 3A and 3B, rotary motion of servo 36a is translated only into motion in the y-axis. Rotary motion of servo 36b is translated only into motion in the x-axis. This translation occurs despite the fact that the servos 36a, 36b are generating motion in both the x-axis and y-axis during normal operation of the servos.

While not so required, in one embodiment, the flexure stage can be comprised of two different types of urethanes, one with 90A shore hardness (a relatively soft material) and the other with 80D shore hardness (a relatively hard material). In this aspect, the softer material serves as the biasing element or spring between two frames. The two different urethanes can be used to create a flexure that is compact and functional. The harder urethane can be used for the main structure of the device (e.g., the frame members 12a, 12b, 12c, 14a, 14b, 14c and 14d), and the softer urethane can be used to form flexible joints (e.g., the biased members 16 and 16a) to enable the flexure to move.

In another embodiment, the flexure stage can be formed from a single material with varying stiffness achieved by way of varying thicknesses of the materials, or varying shapes of linking (e.g., biasing) members. In one aspect, the flexure can be manufactured using shape deposition manufacturing. A variety of other suitable manufacturing techniques, including injection molding, can also be utilized, as will be appreciated by one of ordinary skill in the art having possession of this disclosure.

Figure 4A:
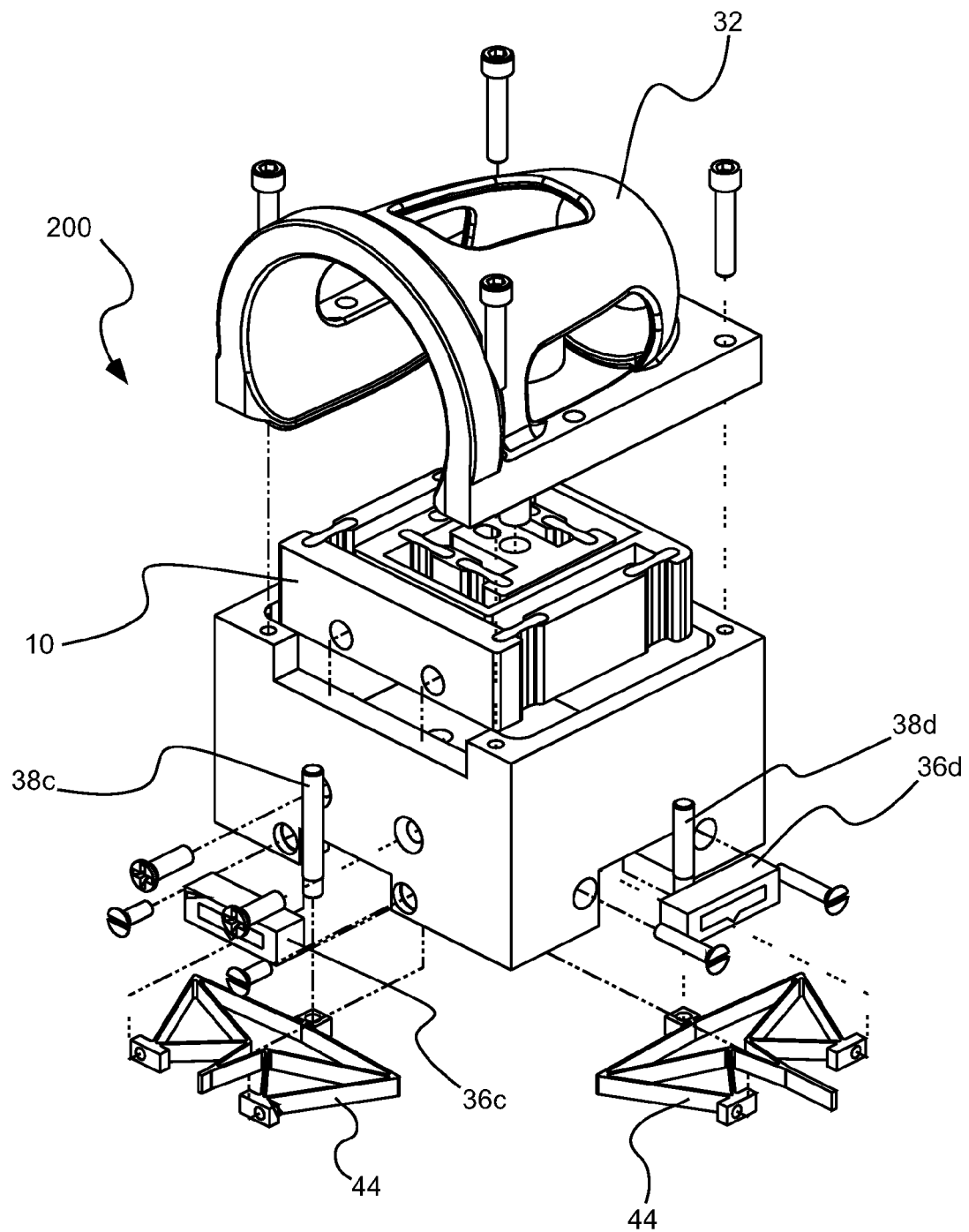
FIG. 4A is a perspective, exploded view of a compact tactile display system in accordance with another embodiment of the invention: this compact tactile display system including piezoelectric actuators.
Figure 4B:
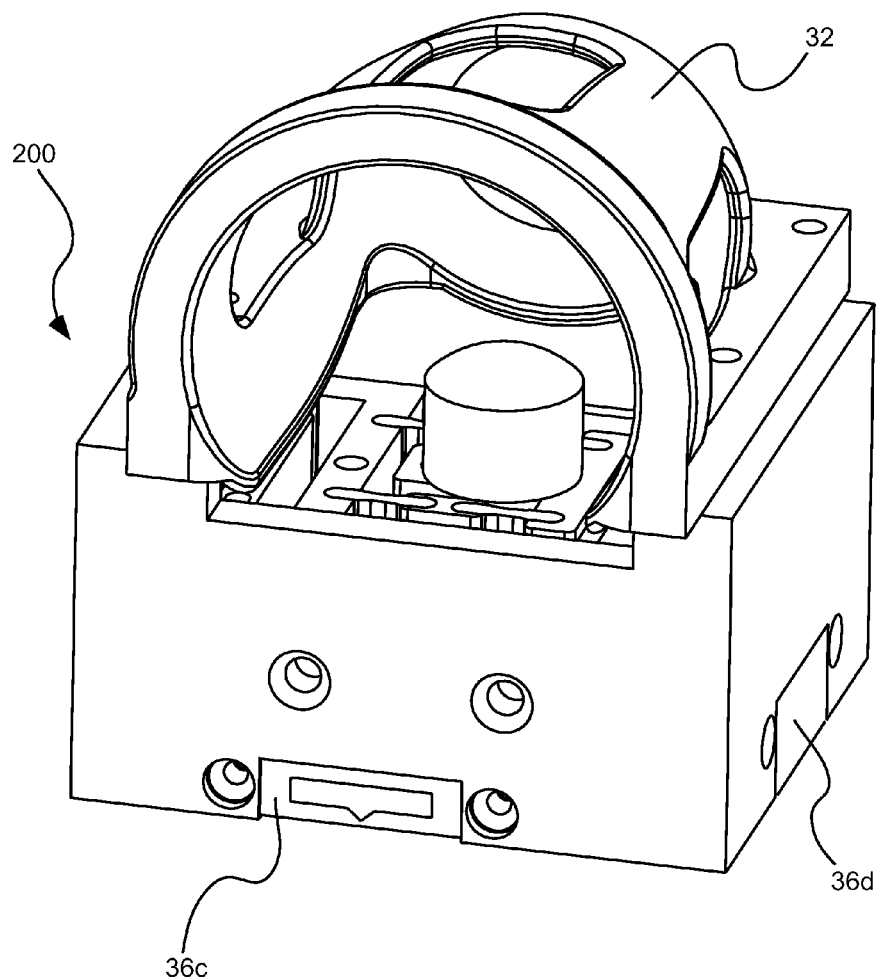
FIG. 4B is a perspective view of the compact tactile display system of FIG. 4A, shown in an assembled condition.

In addition to the servo motor actuators of FIGS. 1-3B, the flexure stage can also be successfully coupled to a wide variety of other actuators, including Shape Memory Alloy (SMA) actuators, common DC motors, solenoids, voice coil actuators, piezoelectric actuators, electroactive polymer actuators (EAP actuators), and the like. For example, FIGS. 4A and 4B illustrate an exemplary system 200 that utilizes piezoelectric actuators 36c, 36d, which are coupled to pins 38c, 38d, respectively, through mechanisms. The pins can interface with flexure 10 in much the same manner as discussed in relation to the embodiment of FIG. 1B. In this embodiment, the piezoelectric actuators can produce very small strains, and hence small displacements. Stroke amplifier mechanisms 44 can be used to compensate for these small displacements.

Figure 5:
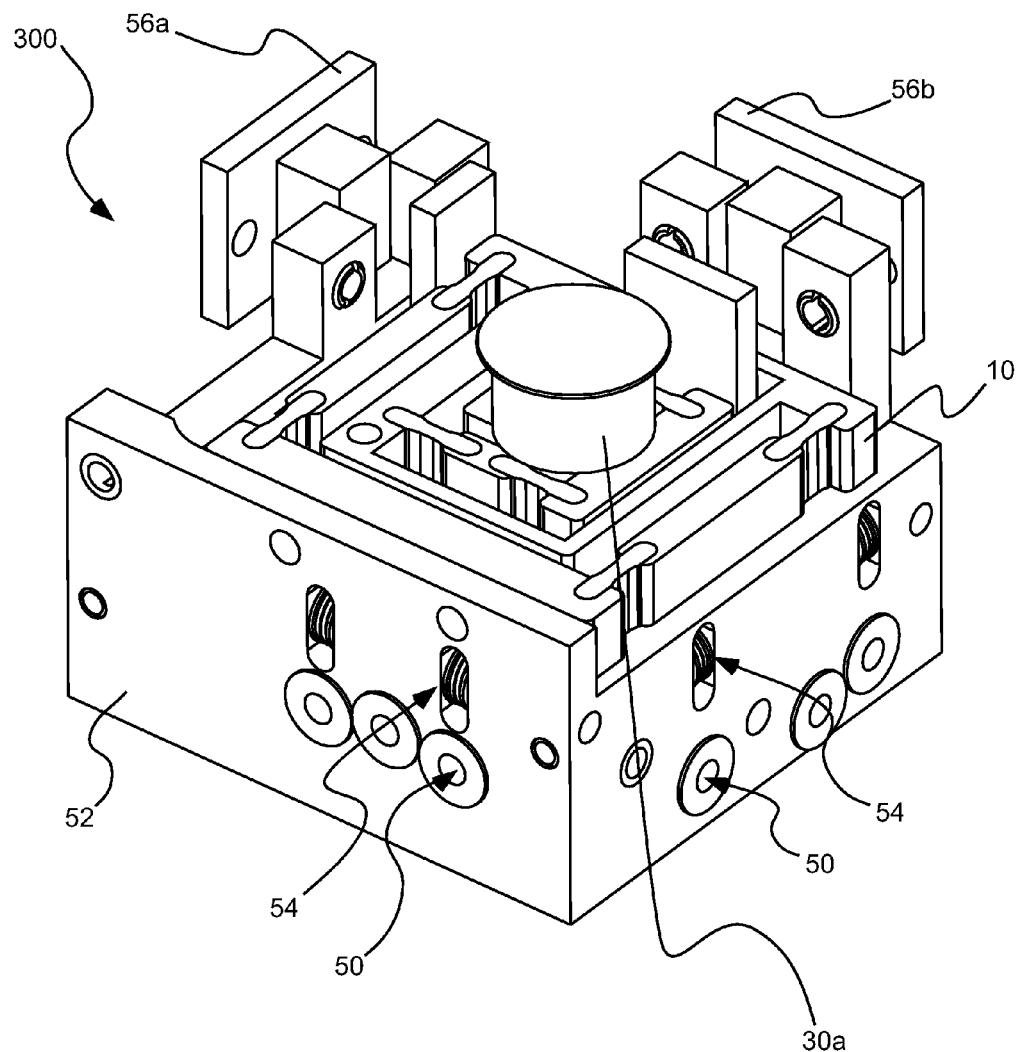
FIG. 5 is a perspective view of a compact tactile display system in accordance with another embodiment of the invention: this compact tactile display system including shape memory alloy ("SMA") actuators.

FIG. 5 illustrates a manner in which in the present invention can be incorporated into a system 300 that utilize wires or similar components to translate motion of actuators into motion of tactor 30a. In this embodiment, a series of wires or cables (not shown) can be coupled between the flexure stage 10 and actuators within cabinet 52, for example SMA actuators (not shown). The wires or cables can be routed to and from the openings 50 formed in base or cabinet 52 and pass over and around pulleys 54. In this manner, actuation in one area of the cabinet can be translated to the appropriate sections of the flexure stage 10. For example, this arrangement can translate motion from an actuator to the flexure stage, even when the actuator is located in an adjacent or remote area of the cabinet.

Various sensors 56a, 56b can be incorporated into the system to measure displacement of various portions of the frame member 10 and/or various components coupled to the frame member (e.g., tactor 30a in FIG. 5). The sensors can be of a variety of types known to those of ordinary skill in the art, including optical sensors.

While illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive.

I claim:

1. A motion translating device for use in a tactile feedback system, comprising:
    a motion output device that imparts motion from a translator to a target area of a user's skin;
    a frame assembly, operable to translate motion from one or more actuators to the motion output device along at least a first axis and a second axis;
    the frame assembly having associated therewith a motion decoupling apparatus, the motion decoupling apparatus being operable to translate motion between at least one of the one or more actuators and the frame assembly along one of the axes while at least partially decoupling motion between at least one of the one or more actuators and the frame assembly along an other axis;
    wherein the motion decoupling apparatus comprises a slot formed in a member of the frame assembly, the slot having a larger dimension in a direction of a decoupled axis and a smaller dimension in a direction of a translated axis.

2. The device of claim 1, wherein the frame assembly includes:
    a first frame operable to translate motion from at least one of the one or more actuators to the motion output device along the first axis;
    a second frame operable to translate motion from at least one of the one or more actuators to the motion output device along the second axis; and wherein
    each frame has associated therewith a motion decoupling apparatus, the motion decoupling apparatuses being operable to translate motion between at least one of the one or more actuators and the frame along one of the axes while at least partially decoupling motion between at least one of the one or more actuators and the frame along an other axis.

3. The device of claim 2, wherein the second frame is coupled within the first frame, and wherein the motion output device is associated with the second frame.

4. The device of claim 3, wherein the second frame is coupled to the first frame by one or more springs, the springs being operable to restrain movement of the second frame relative to the first frame.

5. The device of claim 4, wherein the springs are operable to restrain movement of the second frame to a greater degree in the direction of one axis and to a lesser degree in a direction of an other axis.

6. A tactile display system, comprising:
    a motion output device that engages a target area of a user's skin;

a restraining system that restrains a portion of the user's skin adjacent the motion output device;

an actuation system including one or more actuators, the actuation system being operably coupled to the motion output device and including:

a first frame operable to translate motion from at least one of the one or more actuators to the motion output device along a first axis;

a second frame operable to translate motion from at least one of the one or more actuators to the motion output device along a second axis; and each frame having associated therewith a motion decoupling apparatus, each motion decoupling apparatus being operable to translate motion between at least one of the one or more actuators and the frame along one of the axes while at least partially decoupling motion between at least one of the one or more actuators and the frame along an other axis.

7. The system of claim 6, wherein the motion decoupling apparatus comprises a slot formed in a member of the frame, the slot having a larger dimension in a direction of the decoupled axis and a smaller dimension in a direction of the translated axis.

8. The system of claim 7, further comprising a pin, coupled to the actuator and sized to fit within the slot.

9. The system of claim 6, wherein the second frame is coupled within the first frame, and wherein the motion output device is associated with the second frame.

10. The system of claim 9, wherein the second frame is coupled to the first frame by one or more springs, the springs being operable to restrain movement of the second frame relative to the first frame.

11. The system of claim 10, wherein the springs are operable to restrain movement of the second frame to a greater degree in the direction of one axis and to a lesser degree in a direction of an other axis.

12. The system of claim 6, wherein the actuator is selected from the group consisting of: a piezoelectric actuator; a servo motor; a shape memory alloy actuator; a solenoid; a voice coil actuator; and an electroactive polymer actuator.

13. A method of translating motion from a pair of actuators to a motion output device of a tactile display, comprising:

coupling a motion output device to one of a pair of frames;

coupling each frame to an actuator through a motion decoupling apparatus, each motion decoupling apparatus being operable to translate motion between the actuator and the frame along one axis of movement while at least partially decoupling motion between the actuator and the frame along an other axis of movement, wherein each motion decoupling apparatus comprises a slot formed in a member of the frame, the slot having a larger dimension in a direction of the decoupled axis and a smaller dimension in a direction of the translated axis.

14. The method of claim 13, wherein coupling each frame to an actuator comprises fitting a pin coupled to the actuator within a slot.

15. The method of claim 14, wherein one of the frames is coupled within an outer frame, and wherein the motion output device is coupled to the outer frame.

16. The method of claim 15, wherein the frames are coupled to one another by one or more springs, the springs being operable to restrain movement of the frames relative to one another.

17. The method of claim 16, wherein the springs are operable to restrain relative movement of the frames to a greater degree in the direction of one axis and to a lesser degree in a direction of another axis.

18. The method of claim 13, wherein the actuator is selected from the group consisting of: a piezoelectric actuator; a servo motor; a shape memory alloy actuator; a solenoid; a voice coil actuator; and an electroactive polymer actuator.

* * * * *